(12) United States Patent
Sagawa

(10) Patent No.: US 6,362,860 B1
(45) Date of Patent: Mar. 26, 2002

(54) LCD HAVING METAL SHIELD WHICH SEPARATES DRIVE CIRCUIT FROM PANEL AND BACKLIGHT, WITH ELASTIC SPRING FINGERS CONNECTING SHIELD AND OUTER CASE

(75) Inventor: Fumihiko Sagawa, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/461,149

(22) Filed: Dec. 14, 1999

(30) Foreign Application Priority Data

Dec. 17, 1998 (JP) .......................................... 10-359834

(51) Int. Cl.[7] .......................................... G02F 1/1333
(52) U.S. Cl. .......................................... 349/59
(58) Field of Search ...................... 349/58, 59

(56) References Cited

U.S. PATENT DOCUMENTS

| | | | | |
|---|---|---|---|---|
| 5,438,482 A | * | 8/1995 | Nakamura et al. | 361/816 |
| 5,731,964 A | * | 3/1998 | Kitakubo et al. | 361/816 |
| 5,953,206 A | * | 9/1999 | Jondrow | 361/687 |
| 6,002,582 A | * | 12/1999 | Yeager et al. | 361/681 |
| 6,122,167 A | * | 9/2000 | Smith et al. | 361/687 |

FOREIGN PATENT DOCUMENTS

JP 10-333128 12/1998

* cited by examiner

*Primary Examiner*—Toan Ton
*Assistant Examiner*—Andrew Schechter
(74) *Attorney, Agent, or Firm*—Brinks Hofer Gilson & Lione

(57) ABSTRACT

Disclosed is a liquid crystal display device in which the effect of cutting off an electromagnetic wave generated from a liquid crystal module and a backlight portion in a shield member is improved and in which it is possible to ground the drive control circuit. A liquid crystal display device includes a shield member which is made of an elastic metal and which includes a casing portion having an opening and a plate portion substantially closing the opening, wherein the casing portion has in the entire periphery surrounding the opening a plurality of spring fingers protruding elastically outward, wherein a liquid crystal module and a backlight portion for illuminating the screen of the liquid crystal module are arranged inside the shield member, and wherein a substrate of a drive control circuit for driving and controlling the liquid crystal module and the backlight portion is arranged outside the shield member.

4 Claims, 4 Drawing Sheets

LCD HAVING METAL SHIELD WHICH SEPARATES DRIVE CIRCUIT FROM PANEL AND BACKLIGHT, WITH ELASTIC SPRING FINGERS CONNECTING SHIELD AND OUTER CASE

BACKGROUND OF THE INVENTION

1. Field of the Invention

The present invention relates to a liquid crystal display device and, in particular, to a shield member for cutting off electromagnetic wave and a technique suitable for grounding a drive control circuit.

2. Description of the Related Art

FIG. 4 is a schematic diagram showing a part of a conventional liquid crystal display device.

A liquid crystal display device 10 may use a cold-cathode tube 1 as the light source of the backlight. In the cases 4 and 9 of the liquid crystal display device 10, the light of the cold-cathode tube 1 is diffused by a light guide plate 5 or the like installed on the back side of a liquid crystal module 7, whereby it is possible to illuminate the entire surface of the liquid crystal module 7.

Connected to the both ends of the cold-cathode tube 1 are harnesses 2a and 2b for driving it. A connector 3 is attached to the forward end of the harnesses 2a and 2b so that a power source for applying voltage to the cold-cathode tube 1 may be connected. The harness 2a is formed so as to extend along the cold-cathode tube 1 and is accommodated in a groove 4a formed in the lower case 4 in parallel with the cold-cathode tube 1. The cold-cathode tube 1 driven by the harnesses 2a and 2b causes the light guide plate 5 to shine. The cold-cathode tube 1 and the harnesses 2a and 2b are covered with a cover 6, and above the lower case 4, there are provided the liquid crystal module 7 having printed circuit boards 8 on its sides and the upper case 9, and are secured to each other by screws. Drive circuits for driving the liquid crystal module 7 and the cold-cathode tube 1 are formed on these printed circuit boards 8, and drive LSIs for driving the common electrode and the segment electrode of the liquid module 7 are mounted thereon.

In such a conventional liquid crystal display device, a metal cover formed of tin or the like and surrounding the cold-cathode tube 1, the liquid crystal module 7, etc. may be provided on the inner side of the cases 4 and 9, the metal cover being connected to the cases 4 and 9 through the intermediation of a flange or the like provided on the outer side thereof.

The metal cover provided in the conventional liquid crystal display device is connected to the case through the intermediation of a flange or the like for the purpose of dissipating static electricity to the case. However, there is a demand for using this metal cover as an EMI (electromagnetic interference) member for cutting off the electromagnetic wave generated from the cold-cathode tube 1, the liquid crystal module 7, etc. to improve the operational stability of the printed circuit boards.

Further, there is a demand for utilizing this metal cover to ground the drive circuits, etc. by connecting it to the printed circuit boards 8, etc. For this purpose, it is necessary to make it possible to solder the printed circuit boards 8, etc.

Further, when utilizing the metal cover to ground the drive circuits, etc., it is necessary to press it against the inner surface of the case, etc. to reliably effect connection. For this purpose, elasticity is required, which cannot be expected of tin.

Furthermore, when utilizing the metal cover to ground the drive circuits, etc., it is necessary for the entire metal cover to exhibit equal potential even when there is a difference in impedance between different portions of the metal cover connected to the drive circuits, etc. to secure the operational stability of the drive circuits.

SUMMARY OF THE INVENTION

The present invention has been made in view of the above requirements. Accordingly, the present invention aims to achieve the following objects.

(1) To improve the property of cutting off the electromagnetic wave generated from the liquid crystal module and the backlight portion inside the shield member.

(2) To make it possible to ground the liquid crystal display device with respect to the drive control circuit.

(3) To improve the operational stability of the liquid crystal display device.

To achieve the above objects, there is provided, in accordance with the present invention, a liquid crystal display device comprising a shield member which is made of an elastic metal and which includes a casing portion having an opening and a plate portion substantially closing the opening, wherein the casing portion has in the entire periphery surrounding the opening a plurality of spring fingers protruding elastically outward and arranged in parallel with each other, and an outer case connected to the shield member through the intermediation of the spring fingers, wherein a liquid crystal module and a backlight portion for illuminating the screen of the liquid crystal module are arranged inside the shield member, and wherein a substrate of a drive control circuit for driving and controlling the liquid crystal module and the backlight portion is arranged outside the shield member.

In the present invention, when an electromagnetic wave is generated inside the shield member, it is possible to cut off the electromagnetic wave. and the static electricity of the shield member can be easily dissipated to the exterior by the plurality of spring fingers, so that it is possible to maintain the shield member at an equal potential.

Further, due to this arrangement, it is possible to cut off the electromagnetic waves emitted from the liquid crystal module, the backlight portion, etc., and it is possible to prevent malfunction of the electronic parts such as ICs and LSIs on the substrate. Further, it is possible to connect the shield member with the outer case by the spring fingers, and the static electricity of the shield member can be dissipated to the exterior. Further, it is possible to reduce the contact resistance between the spring fingers and the outer case.

In the present invention, it is possible for the plurality of spring fingers to be arranged substantially at equal intervals, the interval being preferably 20 mm or less and, more preferably, 15 mm or less.

In accordance with the present invention, the interval of the spring fingers is determined to be 20 mm or less and, more preferably, 15 mm or less, so that it is possible to make the entire potential of the shield member more uniform.

The spring fingers are arranged in parallel with each other, and in parallel with the thickness direction of the liquid crystal module, and the shield member can be integrally provided with a ground connection portion connected to the grounding portion of the substrate.

Due to this arrangement, the shield member can be smoothly fitted in the outer case when assembling the outer case and the shield member.

Further, since the metal shield member is integrally provided with the ground connection portion, it is possible to solder the ground connection portion to the substrate.

DESCRIPTION OF THE PREFERRED EMBODIMENT

A liquid crystal display device according an embodiment of the present invention will be described with reference to the drawings.

Figure 1:
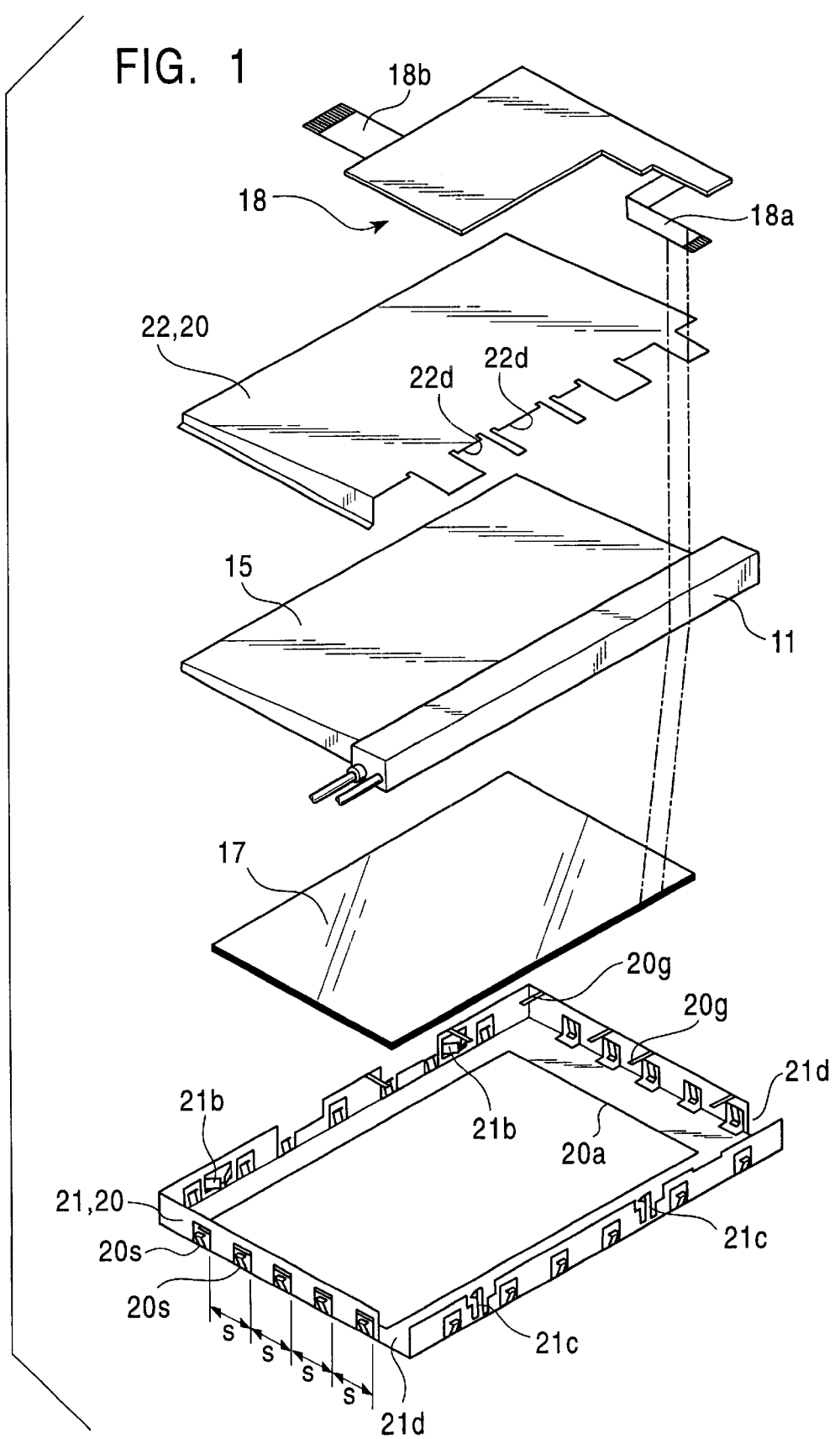
FIG. 1 is an exploded perspective view showing a liquid crystal display device according to an embodiment of the present invention.
Figure 2:
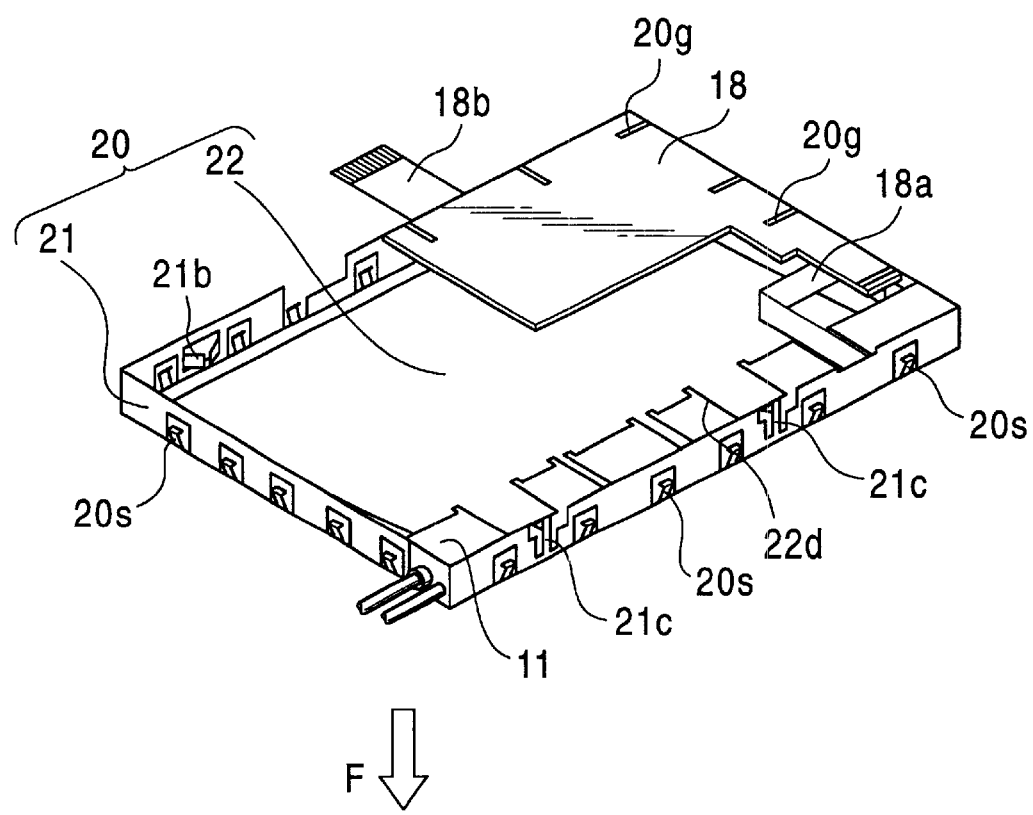
FIG. 2 is an assembly perspective view showing a liquid crystal display device according to an embodiment of the present invention.

FIG. 1 is an exploded perspective view showing a liquid crystal display device according to the embodiment of the present invention; FIG. 2 is an assembly perspective view showing a liquid crystal display device according to the embodiment of the present invention; and FIG. 3 is a cross-sectional view showing the assembly state of a liquid crystal display device according to the embodiment of the present invention.

Figure 3:
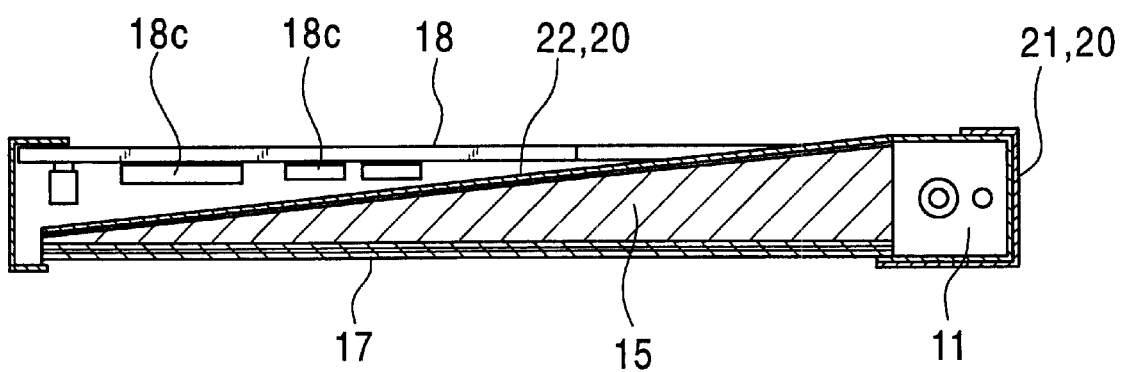
FIG. 3 is a cross-sectional view showing the assembly state of a liquid crystal display device according to an embodiment of the present invention.

In FIGS. 1 through 3, numeral 11 indicates a cold-cathode tube, numeral 15 indicates a light guide plate, numeral 17 indicates a liquid crystal module, numeral 18 indicates a substrate, and numeral 20 indicates a shield member.

The liquid crystal display device of this embodiment is shown in FIGS. 1 through 3 with the outer case omitted. The outer case is formed, for example, of plastic and metal is applied to the inner side thereof.

Figure 4:
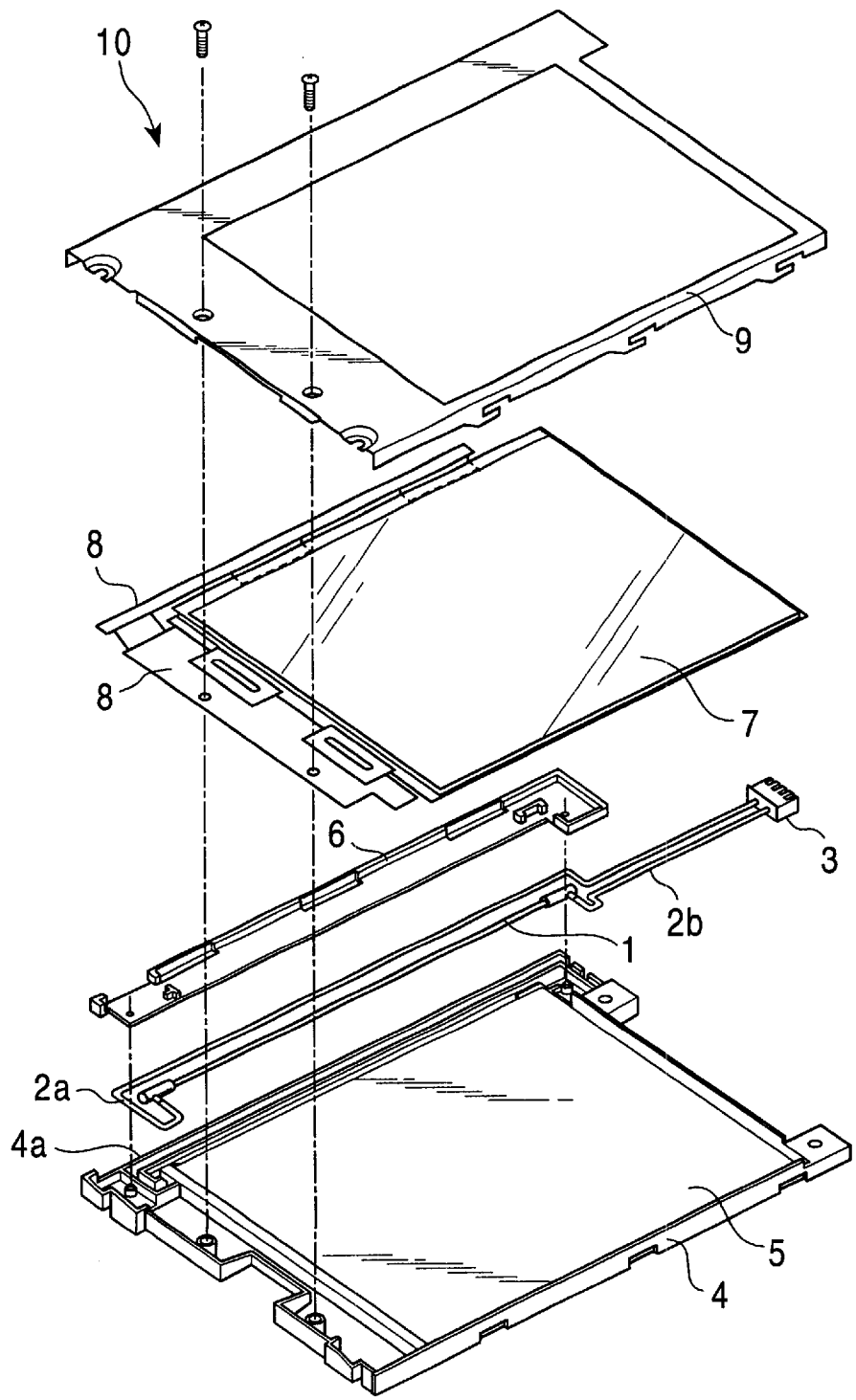
FIG. 4 is a schematic diagram showing a part of a conventional liquid crystal display device.

The outer case is not naturally restricted to that of the conventional example as shown in FIG. 4. It can be of any construction as long as its inner side exhibits conductivity and it can accommodate the liquid crystal module and the backlight portion.

In the liquid crystal display device of this embodiment, the shield member 20 is provided inside the outer case (not shown), and the liquid crystal module 17, the cold-cathode tube 11 for illuminating the screen of the liquid crystal module 17 and the light guide plate 15 are arranged inside the shield member 20, and the substrate 18 of the drive control circuit for driving and controlling the liquid crystal module 17 and the cold-cathode tube 11 are arranged outside the shield member 20.

The cold-cathode tube 11 illuminates the screen of the liquid crystal display device (LCD). Apart from this, it may also be a daylight fluorescent lamp, a thin and long miniature lamp or the like. In the display screen of a liquid crystal display device (LCD), an illumination is required which exhibits high luminance, which is uniform in brightness and which is free from unevenness in luminance. However, the cold-cathode tube 11 or the like is a linear light source and not a planar light source, so that the light guide plate 15 is used which reflects and scatters the light from the linear light source and causes it to uniformly impinge upon the liquid crystal module 17.

The light guide plate 15 consists of a rectangular plate made of an acrylic resin having a relatively high light transmissivity. As shown in FIGS. 1 and 3, it has a tapered configuration, and though not shown, it has on the reflection surface on the side opposite to the liquid crystal module 17 a large number of recess-like dots for reflecting and diffusing light. Instead of these recess-like dots, a large number of reflection layers may be formed. Further, on the surface of this light guide plate 15 on the liquid crystal module 17 side, there are provided a plurality of sheet members for diffusing light (not shown). These sheet members for diffusing light consist of a rectangular diffusion sheet, a rectangular lens sheet on which protrusions and recesses are periodically formed along the shorter side, and a rectangular lens sheet on which protrusions and recesses are longitudinally formed, the sheets being sequentially superimposed one upon the other. The peripheral portions of the sheets are glued into an integral unit, and are further integrated with the light guide plate.

The cold-cathode tube 11 and the light guide plate 15 constitute the backlight portion.

The liquid crystal module 17 constitutes the display screen of the liquid crystal display device (LCD), and is electrically connected to the substrate 18 so that its operation may be controlled.

As shown in FIGS. 1 and 3, the substrate 18 has a drive control circuit having electronic parts 18c such as ICs and LSIs for driving and controlling the liquid crystal module 17 and the cold-cathode tube 11. Further, there is provided a connector 18a for connection with the liquid crystal module 17 and the cold-cathode tube 11, and a connector 18b for connection with a power source portion, etc. (not shown).

The shield member 20 is formed of an elastic metal such as phosphor bronze or stainless steel (SUS), and has an opening 20a for forming the display screen of the liquid crystal module 17, a casing portion 21 whose side opposed to the opening 20a is open, and a plate portion 22 substantially closing the above-mentioned open side.

In the entire periphery of the casing portion surrounding the opening, there are provided a plurality of spring fingers 20s arranged in parallel with each other, through which it is connected to an outer case (not shown).

Integrally provided on the casing portion 21 of the shield member 20 are ground connection portions 20g connected to the substrate 18, and the ground connection portions 20g are connected to the ground positions of the drive control circuit of the substrate 18 by soldering or the like.

As shown in FIGS. 1 and 2, the casing portion 21 is equipped with fastening portions 21b and 21c for fastening the plate portion 22 to the casing portion 21, and cutout portions 21d for boosting heat dissipation of the cold-cathode tube 11.

The plate portion 22 is in contact with the light guide plate 15 in correspondence with the tapered configuration thereof, and is equipped with cutout portions 22d for boosting heat dissipation of the cold-cathode tube 11.

As shown in FIGS. 1 and 2, each of the plurality of spring fingers 20s has a width of approximately 2 mm and formed integrally with the casing portion 21 with a peripheral gap of approximately 1 mm, and elastically protrude to the exterior of the casing portion 21 of the shield member 20. Further, it is arranged in parallel with the thickness direction of the liquid crystal module 17. Further, the forward end portions of the spring fingers 20s are bent toward the interior of the casing portion 21 of the shield member 20 to facilitate the assembly of the casing 21 portion 21 with the outer case (not shown).

As shown in FIGS. 1 and 2, the plurality of spring fingers 20s are arranged substantially at equal intervals over the entire periphery of the casing portion 21. The interval s is preferably 20 mm or less and, more preferably, 15 mm or less.

When the interval of the spring fingers 20s is 20 mm or more, the effect of coping with EMI described below deteriorates, and the distance through which the static electricity on the surface of the liquid crystal module 17 is passed to the ground (GND) increases, with the result that the liquid crystal module 17 is adversely affected. Thus, it is desirable for the interval s to be 20 mm or less and, more preferably, 15 mm or less.

Further, due to the positional relationship between the fastening portions 21b and 21c, the cutout portions 21d, etc., it may happen that the spring fingers 20s are not arranged at equal intervals. In that case also, it is desirable for the interval to be 20 mm or less and, more preferably, 15 mm or less.

In this liquid crystal display device, the liquid crystal module 17 is provided inside the casing portion 21 of the shield member 20 in correspondence with the opening 20a, and the light guide plate 15 of the backlight portion is provided so as to be in close contact with the liquid crystal module 17, and the cold-cathode tube 11 is provided at the position corresponding to the cutout portions 21d, and the plate portion 22 provided outside these components is fastened to the casing portion 21 by the fastening portions 21b and 21c, and the substrate 18 connected to the liquid crystal module 17 and the cold-cathode tube 11 by the connector 18a is placed outside the plate portion 22 of the shield member 20. As shown in FIG. 3, the liquid crystal module 17, the backlight portion, and the substrate 18 substantially arranged inside the shield member 20 are moved with the shield member 20 in the direction indicated by the arrow F shown in FIG. 2 to fit them into the outer case (not shown) to assemble the device. At this time, the substrate 18 is provided inside the casing portion 21 of the shield member 20 such that the electronic parts such as ICs, LSIs, etc. are in correspondence with the tapered light guide plate 15. As shown in FIG. 2, assembly is conducted such that the plate portion 22 is positioned between the connector 18a and the cold-cathode tube 11.

In the liquid crystal display device of this embodiment, white light emitted from the cold-cathode tube 11 controlled by the drive control circuit of the substrate 18 impinges upon one end surface of the light guide plate 15, and is reflected and diffused by a large number of dots (or a large number of reflection plates) in the light guide plate 15, and emitted from the entire surface of the light guide plate 15 on the liquid crystal module 17 side. This emitted light is diffused in a planar direction by the diffusion sheet and uniformalized, and transmitted sequentially through a plurality of lens sheets to thereby become light made uniform in both in the short side direction and the longitudinal direction before it impinges upon the liquid crystal module 17 as planar illumination which is uniform in the luminance in the planar direction and becomes the backlight of the liquid crystal module 17, and screen display is effected by the liquid crystal module 17 controlled by the drive control circuit of the substrate 18.

At this time, the shield member 20 surrounds the liquid crystal module 17 and the cold-cathode tube 11, so that it can function as an EMI (electromagnetic interference) member, cutting off the electromagnetic wave generated from the liquid crystal module 17, the cold-cathode tube 11, etc. that are operating.

According to the present invention, in the shield member 20, it is possible to connect the shield member 20 with the outer case by the plurality of spring fingers 20s, and it is easy to dissipate the static electricity of the shield member 20 to the exterior, in particular, to the outer case, making it possible to maintain the entire shield member 20 at equal potential. Further, the spring fingers 20s are provided in the entire periphery of the casing member 21 of the shield member 20, so that even if the contact resistance between one spring finger 20s and the outer case increases, no problem is involved and it is possible to reduce the contact resistance between the plurality of spring fingers 20s and the outer case. Further, since the interval of the spring fingers 20s is determined to be 20 mm or less, and more preferably, 15 mm or less, it is easy to dissipate the static electricity of the shield member 20 to the outer case, and it is easy to eliminate the unevenness in potential in the shield member 20 and set the ground potential of the shield member 20 at a fixed level.

The spring fingers 20s are arranged in parallel with the thickness direction of the liquid crystal module 17, that is, the assembly direction indicated by the arrow F shown in FIG. 2, and the shield member 20 is integrally provided with the ground connection portion connected to the substrate, whereby it is possible to smoothly fit the shield member 20 in the outer case when assembling the outer case and the shield member 20.

Further, since the metal shield member 20 is integrally provided with the ground connection portions 20g, so that it is possible to solder the ground connection portions 20g to the substrate 18 to ground the drive control circuit in the substrate 18.

As described above, the shield member 20 cuts off the electromagnetic wave generated from the liquid crystal module 17 and the cold-cathode tube 11 of the backlight portion, etc. that are operating, whereby it is possible to improve the operational stability of the drive control circuit of the substrate 18 having electromagnetic parts such as ICs, LSIs, etc.

Further, the ground potential of the shield member 20 can be made constant and stabilized by the spring fingers 20s, so that it is possible to improve the operational stability of the drive control circuit of the substrate 18 having electromagnetic parts such as ICs, LSIs, etc.

The liquid crystal display device of the present invention provides the following advantages.

(1) The liquid crystal module and the backlight portion of the cold-cathode tube, etc. are covered by a shield member which is formed of an elastic metal and which has a casing portion with one side open and a plate portion substantially closing the open side, the casing portion being provided with a plurality of spring fingers arranged in parallel over the entire periphery surrounding the opening, whereby it is possible to improve the effect of cutting off the electromagnetic wave generated from the liquid crystal module and the backlight portion.

(2) Since the shield member is provided with a ground connection portion, it is possible to ground the drive control circuit of the liquid crystal display device, and due to the provision of a plurality of spring fingers, it is possible to make the ground potential of the shield member constant and stabilize it.

(3) Due to the above arrangement, it is possible to improve the operational stability of the liquid crystal display device.

What is claimed is:

1. A liquid crystal display device comprising a shield member which is made of an elastic metal and which includes a casing portion having an opening and a plate portion substantially closing the opening, wherein the casing portion has in the entire periphery surrounding the opening a plurality of spring fingers protruding elastically outward, and an outer case connected to the shield member through the intermediation of the spring fingers, wherein a liquid crystal module and a backlight portion for illuminating the screen of the liquid crystal module are arranged inside the shield member, and wherein a substrate of a drive control circuit for driving and controlling the liquid crystal module and the backlight portion is arranged outside the shield member.

2. A liquid crystal display device according to claim 1, wherein the plurality of spring fingers are arranged in parallel with each other.

3. A liquid crystal display device according to claim 2, wherein the spring fingers are arranged in parallel with the thickness direction of the liquid crystal module.

4. A liquid crystal display device according to claim 1, wherein the shield member is integrally provided with a ground connection portion connected to the grounding part of the substrate.

* * * * *